C. H. HALL.
HOBBY HORSE.
APPLICATION FILED DEC. 13, 1915.

1,295,739.

Patented Feb. 25, 1919.
3 SHEETS—SHEET 1.

Witnesses:

Inventor:
Charles H. Hall,
By L. B. Copeland,
Atty.

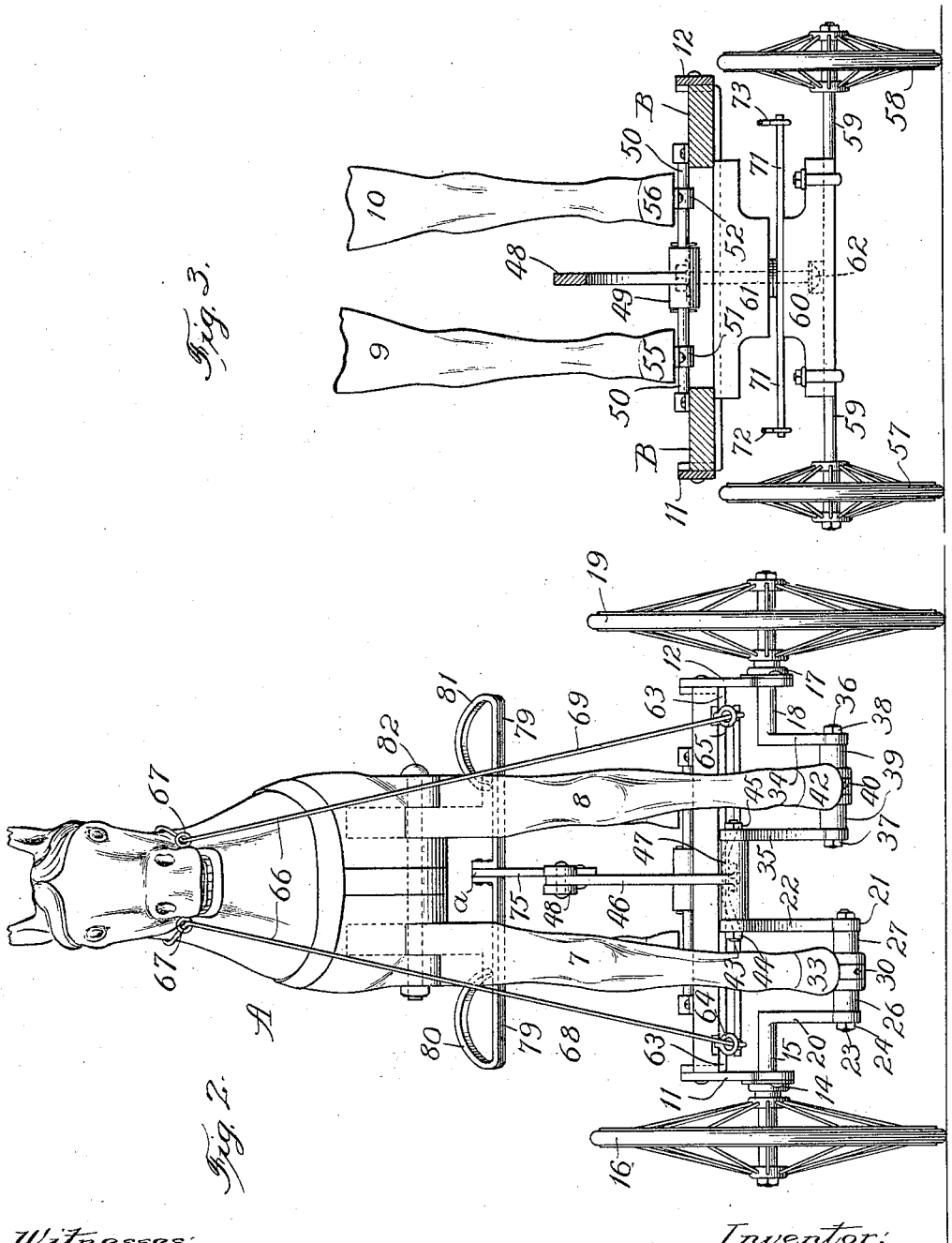

C. H. HALL.
HOBBY HORSE.
APPLICATION FILED DEC. 13, 1915.
1,295,739.
Patented Feb. 25, 1919.
3 SHEETS—SHEET 3.
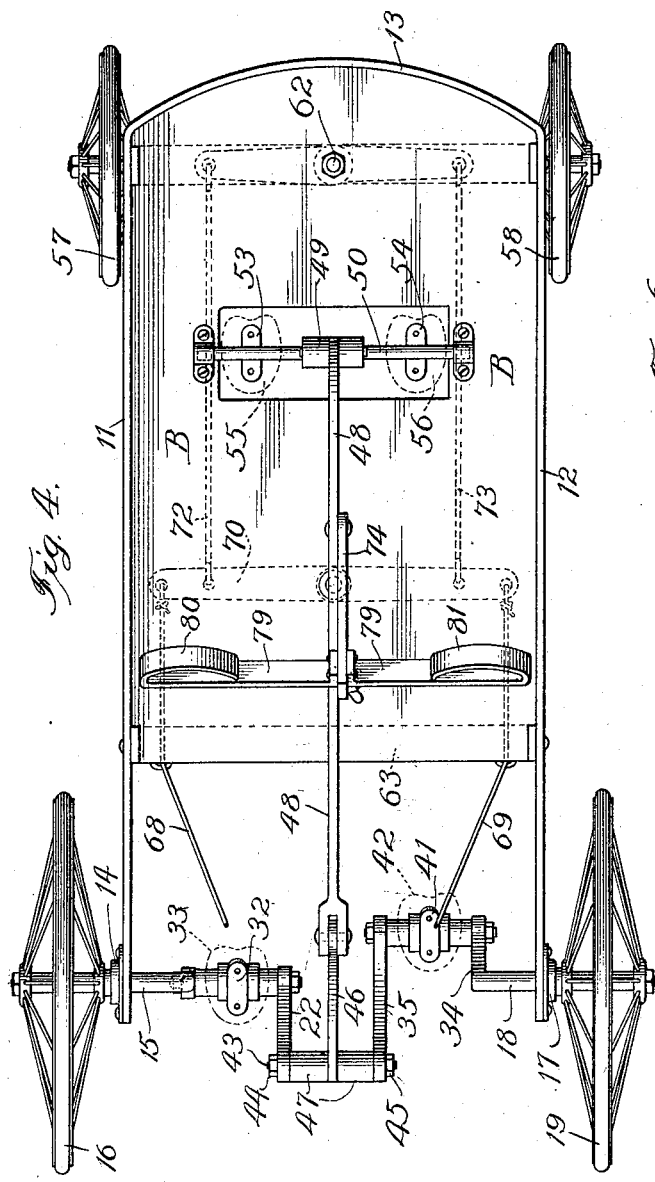
Witnesses:
Inventor:
Charles H. Hall,
By L. B. Copland,
Atty.

UNITED STATES PATENT OFFICE.

CHARLES H. HALL, OF CHICAGO, ILLINOIS, ASSIGNOR OF ONE-HALF TO MAX TROUTMANN, OF CHICAGO, ILLINOIS.

HOBBY-HORSE.

1,295,739.           Specification of Letters Patent.      Patented Feb. 25, 1919.

Application filed December 13, 1915. Serial No. 66,542.

*To all whom it may concern:*

Be it known that I, CHARLES H. HALL, a citizen of the United States, residing at Chicago, in the county of Cook and State of Illinois, have invented certain new and useful Improvements in Hobby - Horses, of which the following is a specification.

This invention relates to hobby horses; and has for its principal object to provide a new and novel device of this character, as will be hereinafter set forth in detail.

A further object is to so mount and support the figure of a horse or other animal on a vehicle structure that the figure will have a rocking movement similar to that of a running animal and propel the vehicle part at the same time.

Fig. 2 is a front end elevation.

Fig. 3 is a vertical sectional detail, on line 3—3, Fig. 1.

Fig. 4 is a plan, the horse being omitted.

Fig. 5 is a vertical section of one of the crank-bearings.

Fig. 6 is a transverse section on line 6—6, Fig. 5.

Figure 1:
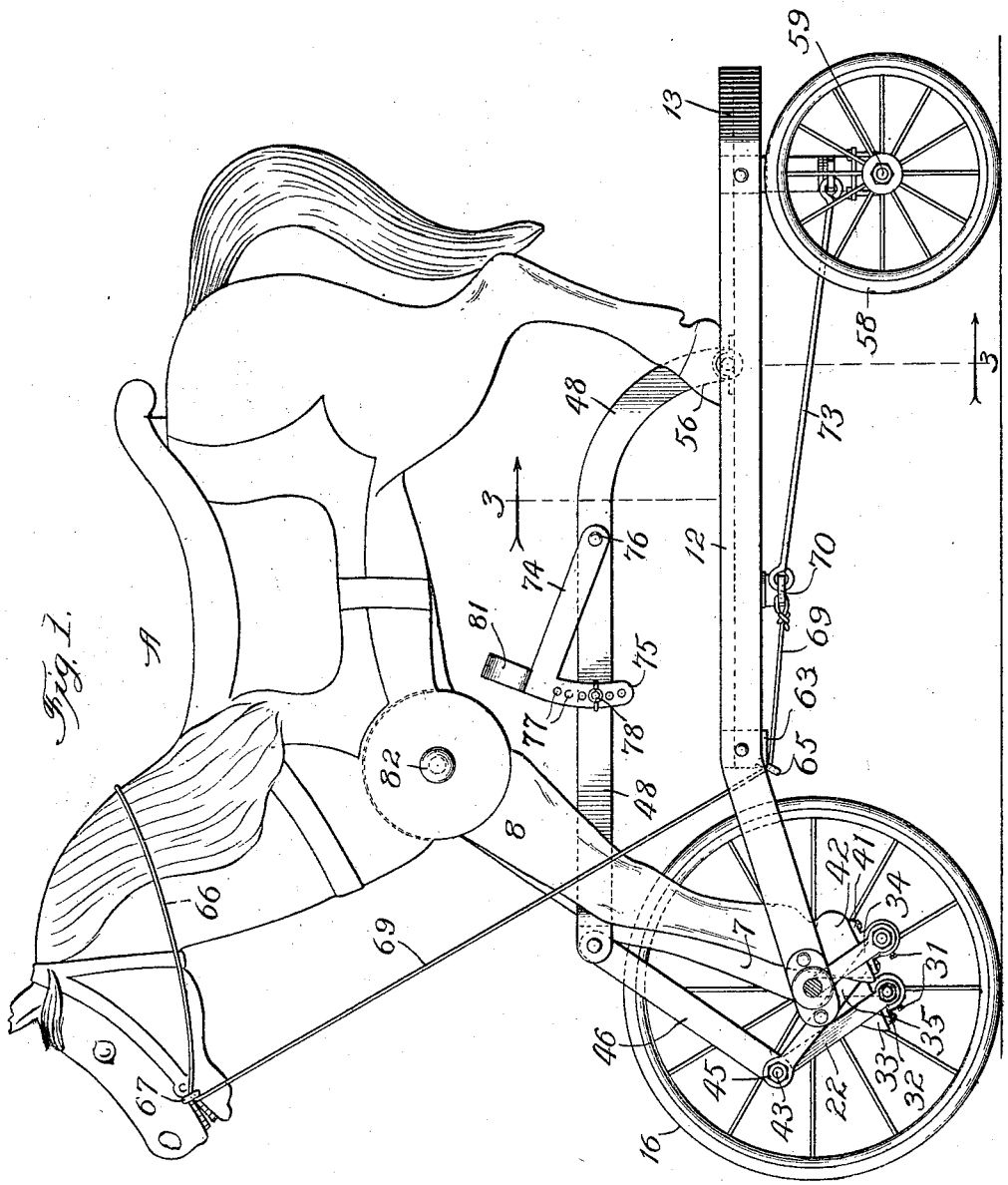
Figure 1 is an elevation of a device embodying the improved features.

A may represent the body of a horse, 7 and 8 the front legs, and 9 and 10 the hind legs thereof.

The supporting frame and vehicle parts, comprise a platform B and inclosing frame parts secured to the respective sides and rear end thereof, as best shown in Fig. 4. The inclosing frame - part consists of the companion longitudinal side-bars 11 and 12 and the rear connecting end bar 13. The front end of side bar 11 is bent downward at the inclined angle shown and provides a support and bearing 14 for the crank-axle 15, on the outer end of which the front vehicle-wheel 16 is mounted. The front end of companion side-bar 12 is also bent downward and provides a support and bearing 17 for the crank-axle 18 having the front vehicle wheel 19 mounted on the outer end thereof, all as best shown in Fig. 4. The short crank arm 20, forming a part of axle 15, and the adjacent end 21 of the longer crank-arm 22, are connected by a nonrotatable shaft 23 having its respective ends threaded for the engagement of clamping nuts 24 and 25. A bearing-box composed of two parts 26 and 27 which are rigidly mounted on shaft 23 and have their inner ends cupped out for the insertion of the anti-friction bearing balls 28, is shown in Fig. 5. A bearing-cone 29 is loosely mounted on shaft 23 and a ring 30 is mounted on said cone and adjustably secured thereto by a set-screw 31. A foot-plate 32 forms a part of ring 30 and has the front foot 33 of the horse secured thereto, as best shown in Figs. 4 and 6.

The outer end of crank-arm 34, forming a part of axle 18, and the adjacent end of the longer crank-arm 35, are connected by a nonrotatable shaft 36 clamped in place by nuts 37 and 38 threaded on the ends thereof. A two-part bearing-box 39 is mounted on shaft 36, as is also a ring 40 provided with a foot-plate 41 to which the front foot 42 of the horse is secured. It will be understood that this bearing construction is the same as that described for the companion front foot connection, as shown in the detail Fig. 5.

The adjacent ends of crank-arms 22 and 35 are connected by a nonrotatable shaft 43 having its respective ends threaded for the engagement of clamping nuts 44 and 45. The outer end of a link 46 has a bearing sleeve 47 formed thereon which is loosely mounted on shaft 43. The inner end of link 46 connects with the front end of a pedal lever 48, the rear downwardly curved end of which is provided with a sleeve 49 and loosely mounted on a stationary shaft 50, as best shown in Figs. 3 and 4.

The companion bearing sleeves 51 and 52 are loosely mounted on shaft 50 and are provided with foot-plates 53 and 54 to which the hind feet 55 and 56 are secured, as best shown in Fig. 3. This provides for a limited turning movement of sleeves 51 and 52, so that the hind feet will have a slight rocking action in conforming to a greater movement of the front part of the horse.

The actuating movement connection supporting the front feet of the horse consists of a triple crank arrangement forming a continuous part of the axles 15 and 18, the front vehicle wheels 16 and 19 being mounted on the outer ends thereof. The companion out-side auxiliary cranks have the front feet 33 and 42 secured thereto and move therewith as best shown is Fig. 2. It will be understood that the front feet are supported in horizontal alinement and maintain that relative position in practical working.

The central actuating or driving crank is set at an angle with reference to the companion cranks, thus avoiding dead centers when each of the cranks is actuated.

By locating the plurality of cranks at the front end instead of the rear end, it is possible to increase the power of the driving mechanism by utilizing a part of the weight of the rider. This advantage is secured by setting the foot movement cranks somewhat in advance of the driving crank and thereby increase the leverage power through the leg connections in addition to the power transmitted through the driving pedals.

This arrangement has the effect of providing an increased leverage action over that of the ordinary pedal movement and proportionately increases the propelling power with less expenditure of driving force and insures a continuous smooth rotary movement without jar.

The hind vehicle wheels 57 and 58 are mounted on the respective ends of an axle 59. The lower bolster member 60 is also mounted on axle 59. The upper bolster member 61 is secured to the underside of platform B, as best shown in Fig. 3. A king-bolt 62 connects the bolster members and forms the axis of oscillation for the turning of the rear axle in the operation of steering.

The front transverse frame-bar 63 has its respective ends secured to the side frame bars 11 and 12, and is provided with rein loops 64 and 65. A steering rein 66 rests on the neck of the horse within convenient reach of the rider and branches off to each side and down through loops 67 fixed in the head of the horse, then through loops 64 and 65, located adjacent to the respective ends of the frame-bar 63, and then rearwardly therefrom to where the rein branch ends 68 and 69 are secured to the respective ends of a transverse evener-bar 70 which is mounted in place to have an oscillating movement in a horizontal plane. A transverse bar 71 is rigid on bolster-member 60, and has the rear ends of companion steering rods 72 and 73 secured to the respective ends thereof, as best shown in Fig. 3 and indicated by dotted lines in Fig. 4. The front ends of the steering-rods connect with the respective ends of the evener-bar 70 and complete the operative steering connection between the guide reins and the hind wheels.

An angle arm consisting of the part 74 and the part 75, is connected at its rear end to the pedal-lever 48, by a pivot-pin 76. The part 75 is provided with a number of perforations 77 and adjustably connected to bar 48 by a clamping bolt 78. A foot-rest bar 79, provided on its respective ends with stirrup-loops 80 and 81, is rigidly secured to the angle arm part 75, as at *a*. By removing the bolt 78, the supporting position of the arm 70 may be raised or lowered in changing the position of the pedal foot-rest bar 79 in accordance with the leg-length of the rider.

A bolt 82 forms a pivotal connection between the body of the figure and the front legs so that the latter can have the proper movement in action.

The general details of construction and arrangement shown and described may be changed or varied in accordance with the requirements of practical working, without departing from the objects of the invention.

In practical working, the rider imparts the usual pedaling movement through the medium of the foot-rest bar which has the effect of transmitting the required motion to the different parts.

Having thus described my invention, what I claim is:—

1. In a device of the class described, a vehicle support, a four-footed body mounted thereon, a driving crank, auxiliary cranks forming extensions of said driving crank and set at an oblique angle with respect to said driving crank, the front legs of the body being connected to said auxiliary cranks, a lever pivotally connected with said support and a link pivotally connected with the driving crank at one end and with the lever at the other.

2. In a device of the class described, a vehicle support, a four-footed body mounted thereon, a driving crank, auxiliary cranks forming extensions of said driving crank and set at an oblique angle with respect to said driving crank, the front legs of the body being connected to said auxiliary cranks, a lever pivotally connected with said support, a link pivotally connected with the driving crank at one end and with the lever at the other, and vertically adjustable pedals carried by said lever.

3. In a device of the class described, a vehicle support, a four-footed body mounted thereon, a driving crank, auxiliary cranks forming extensions of said driving crank and set at an oblique angle with respect to said driving crank, the front legs of the body being pivotally connected to said auxiliary cranks at their lower end and being pivotally connected to the body at their upper end, and the rear legs being rigidly secured to the body and pivotally secured at their lower ends to the support arranged to remain in a horizontal position.

4. In a device of the class described, a vehicle support, a four-footed body mounted thereon, a driving crank, auxiliary cranks forming extensions of said driving crank and set at an oblique angle with respect to said driving crank, the front legs of the body being pivotally connected to said auxiliary cranks at their lower end and being pivotally connected to the body at their upper end, the rear legs being rigidly secured to the body and pivotally secured at their lower ends to the support, a lever pivotally connected to the support, a link pivotally connected to the end of the lever at one end and to the driving crank at the other, and pedals carried by said lever.

In testimony whereof I affix my signature in presence of two witnesses.

CHARLES H. HALL.

Witnesses:
MAX TRAUTMANN,
G. E. CHURCH.

Copies of this patent may be obtained for five cents each, by addressing the "Commissioner of Patents, Washington, D. C."